United States Patent
Kim et al.

(10) Patent No.: US 12,470,341 B2
(45) Date of Patent: Nov. 11, 2025

(54) VSAT DEMODULATOR ARCHITECTURE FOR BEAM HOPPING SATELLITE SYSTEMS

(71) Applicant: Hughes Network Systems, LLC, Germantown, MD (US)

(72) Inventors: Seokho Kim, North Potomac, MD (US); Sri Bhat, Boyds, MD (US); Brandon Lasher, Thurmont, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 529 days.

(21) Appl. No.: 18/064,370

(22) Filed: Dec. 12, 2022

(65) Prior Publication Data
US 2024/0195556 A1 Jun. 13, 2024

(51) Int. Cl.
*H04L 5/00* (2006.01)
*H04W 36/06* (2009.01)
(Continued)

(52) U.S. Cl.
CPC ........... *H04L 5/0048* (2013.01); *H04W 36/06* (2013.01); *H04W 72/0446* (2013.01); *H04W 72/046* (2013.01)

(58) Field of Classification Search
CPC ........... H04L 5/0048; H04L 25/03012; H04W 36/06; H04W 72/0446; H04W 72/046;
(Continued)

(56) References Cited

U.S. PATENT DOCUMENTS

2016/0352415 A1 12/2016 Subramaniam et al.
2019/0199428 A1* 6/2019 Regunathan ......... H04B 7/2041

FOREIGN PATENT DOCUMENTS

WO 2022245603 A1 11/2022

OTHER PUBLICATIONS

"Digital Video Broadcasting (DVB) Implementation Guidelines for the Second Generation System for Broadcasting, Interactive Services, News Gathering and Other Broadband Satellite Applications", ETSI TR 102 376-2, vol. 1.2.1, No. 3, Jan. 2021, pp. 1-212.
(Continued)

Primary Examiner — Chae S Lee
(74) Attorney, Agent, or Firm — Kilpatrick Townsend & Stockton LLP

(57) ABSTRACT

Techniques are described for demodulating burst communications, such as for demodulating satellite beam-hopping communications in a demodulator of a very small aperture terminal (VSAT) satellite receiver. The demodulator includes a front-end and a sample/symbol domain processor. The front-end is configured to selectively operate in either of an adaptive mode or a freeze mode. During demodulation, the sample/symbol domain processor detects start of superframe (SOSF) and end of superframe (EOSF) locations to determine where each dwell time and non-dwell time begins and ends. During at least a portion or each dwell time, the front-end is set to operate in adaptive mode, in which the front-end uses feedback control from the sample/symbol domain processor to continuously adapt to timing and frequency of the received burst transmission. During at least the duration of each non-dwell time, the front-end is set to operate in freeze mode, in which adaptation of the front-end is frozen.

23 Claims, 9 Drawing Sheets

(51) Int. Cl.
*H04W 72/044* (2023.01)
*H04W 72/0446* (2023.01)

(58) Field of Classification Search
CPC ............. H04W 56/001; H04B 7/18528; H04B 7/2041; H04B 7/18517
See application file for complete search history.

(56) References Cited

OTHER PUBLICATIONS

Application No. PCT/US2023/082443, International Search Report and Written Opinion, mailed on Mar. 27, 2024, 13 pages.

* cited by examiner

VSAT DEMODULATOR ARCHITECTURE FOR BEAM HOPPING SATELLITE SYSTEMS

FIELD

The present disclosure relates to satellite communications, and, in particular, demodulation of non-continuous (e.g., beam-hopping) communications in a Very Small Aperture Terminal (VSAT) receiver.

BACKGROUND

Digital Video Broadcasting System version 2 (DVB-S2) standards describe a Very Small Aperture Terminal (VSAT) providing a continuous forward link, such as where the receiver is always in a receive mode. In some architectures, the VSAT receiver includes a demodulator that continuously updates timing and frequency recovery to adapt to samples of the received continuous stream. Second-generation satellite extensions to the standard, referred to as DVB-S2X, include air interface support for non-continuous communications, such as to support half-duplex communications, burst communications, beam hopping, and the like. With such non-continuous streams, there can be times when the VSAT is "receiving" (e.g., receiving recognizable and decodable signals, such as in frame or superframe structures), and other times when the VSAT is "not receiving" (e.g., receiving unrecognizable signals, Gaussian noise, etc.). This can cause problems for VSAT demodulators that rely on a continuous stream of received symbols for adaptive timing and frequency recovery.

SUMMARY

Embodiments include systems and methods for demodulating burst communications, such as for demodulating satellite beam-hopping communications in a demodulator of a very small aperture terminal (VSAT) satellite receiver. The demodulator includes a front-end and a sample/symbol domain processor. The front-end is configured to selectively operate in either of an adaptive mode or a freeze mode. During demodulation, the sample/symbol domain processor detects start of superframe (SOSF) and end of superframe (EOSF) locations to determine where each dwell time and non-dwell time begins and ends. During at least a portion or each dwell time, the front-end is set to operate in adaptive mode, in which the front-end uses feedback control from the sample/symbol domain processor to continuously adapt to timing and frequency of the received burst transmission. During at least the duration of each non-dwell time, the front-end is set to operate in freeze mode, in which adaptation of the front-end is frozen (e.g., according to last valid adaptation values).

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Designs of high-throughput communication satellites typically seek to maximize throughput to receiver terminals, such as very small aperture terminals (VSATs). The satellite is allocated a particular amount of bandwidth resources, and those resources can be used in various ways to provide high-throughput communication services, such as in accordance with Digital Video Broadcasting System version 2 (DVB-S2) standards. Earlier DVB-S2 standards described a VSAT providing a continuous forward link, such as where the receiver is always in a receive mode. In some such VSATs, the receiver includes demodulator components (e.g., bit timing recovery, or BTR) that continuously update timing and frequency recovery to adapt to samples of the received continuous stream.

More recent DVB-S2 standards, referred to as second-generation satellite extensions (DVB-S2X), include air interface support for non-continuous ("burst") communications, such as to support half-duplex communications and beam hopping. With such non-continuous streams, there can be times when the VSAT is "receiving" (e.g., receiving recognizable and decodable signals, such as in frame or superframe structures), and other times when the VSAT is "not receiving" (e.g., receiving unrecognizable signals, streams not intended for decoding by the receiving VSAT, Gaussian noise, etc.). This can cause problems for VSAT demodulators that rely on a continuous stream of received symbols for adaptive timing and frequency recovery.

Embodiments described herein adapt a continuously adaptive demodulator of a VSAT receiver for use with burst communications, such as for beam hopping. Embodiments of the receiver demodulator include a demodulator front-end and a sample/symbol domain processor. The sample/symbol domain processor detects presence of decodable superframe structures, indicating whether a valid signal is being received. While a valid signal is being received, the demodulator front-end adapts timing and frequency recovery to samples of the received signal. When the sample/symbol domain processor detects or determines that an end of the valid signal is approaching, the demodulator front-end can pause adaptation (e.g., any timing and frequency recovery, filter parameters, etc. can continue in an open loop fashion without feedback adaptation), and the demodulator front-end can be allowed to continue adaptation from where it left off only when the sample/symbol domain processor detects a next valid signal is being received. In this way, the demodulator front-end only adapts to valid samples and does not have from invalid adaptations each time a new valid signal is acquired.

Figure 1:
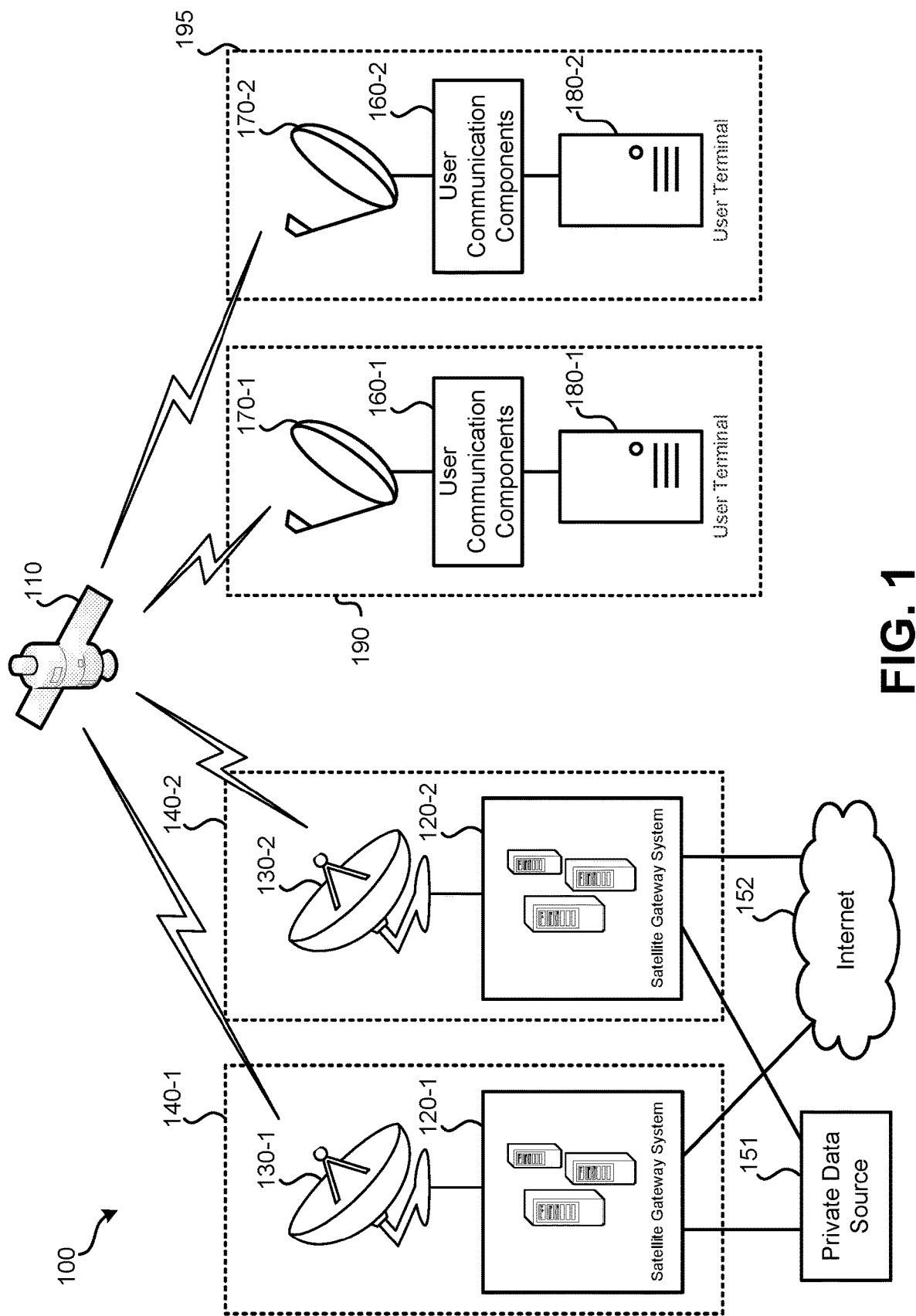
FIG. 1 illustrates an embodiment of a bidirectional satellite communication system.

Further detail regarding these concepts is provided in relation to the figures. FIG. 1 illustrates an embodiment of a bidirectional satellite communication system 100 as a context for embodiments described herein. Bidirectional satellite communication system 100 may include: relay satellite 110; satellite gateway systems 120; bidirectional satellite communication links 130; private data source 151; user communication components 160; satellite antennas 170; and user terminals 180. Relay satellite 110 may be a bidirectional communication satellite that relays communications between satellite gateway systems 120 and user communication components 160. Therefore, via relay satellite 110, data may be transmitted from satellite gateway systems 120 to user communication components 160 and data may be transmitted from user communication components 160 to satellite gateway systems 120. Embodiments described herein focus on forward-link communications from the satellite gateway systems 120 to the user communication components 160 via the relay satellite 110. More specifically, embodiments described herein primarily focus on the downlink portion of the forward-link from the relay satellite 110 to the user communication components 160.

In some embodiments, system 100 may be used to provide user communication components 160 with Internet access (via Internet 152), and/or access to any other suitable public and/or private networks. Additionally or alternatively, system 100 may be used to provide user communication components 160 with access to private data source 151, which may be a private network, data source, or server system. In some architectures, satellite gateway systems 120 are in communication with backhaul infrastructure, terrestrial networks, and/or other communications infrastructure.

Relay satellite 110 may use different frequencies for communication with satellite gateway systems 120 than for communication with user communication components 160. Further, different frequencies may be used for uplink communications than for downlink communications. For example, different frequency bands, sub-bands, etc. can be used for some or all of forward uplink communications (satellite gateway system 120 to relay satellite 110), forward downlink communications (relay satellite 110 to user communication components 160), return uplink communications (user communication components 160 to relay satellite 110), and return downlink communications (relay satellite 110 to satellite gateway system 120).

Each satellite gateway system 120 is located at a respective geographic location 140. For example, satellite gateway system 120-1 communicates with relay satellite 110 using bidirectional satellite communication link 130-1, which can include one or more high-gain antennas that allow high data transmission rates between satellite gateway system 120-1 and relay satellite 110. Satellite gateway system 120-1 may receive data from and transmit data to many instances of user equipment, such as user communication components 160. Satellite gateway system 120-1 may encode data into a proper format for relaying by relay satellite 110. Similarly, satellite gateway system 120-1 may decode data received from various instances of user communication components 160 received via relay satellite 110.

Satellite gateway system 120-1 may serve as an intermediary between the satellite communication system and other data sources, such as private data source 151 and Internet 152. Satellite gateway system 121 may receive requests from user communication components 160 via relay satellite 110 for data accessible using Internet 152. Satellite gateway system 120-1 may retrieve such data from Internet 152 and transmit the retrieved data to the requesting instance of user equipment via relay satellite 110. Additionally or alternatively, satellite gateway system 120-1 may receive requests from user communication components 160 via relay satellite 110 for data accessible in private data source 151. Satellite gateway system 120-1 may retrieve such data from private data source 151 and transmit the retrieved data to the requesting instance of user equipment via relay satellite 110.

Satellite gateway system 120-2 may function similarly to satellite gateway system 120-1, but may be located in a different physical location. While satellite gateway system 120-1 is located at geographic location 140-1, satellite gateway system 120-2 is located at geographic location 140-2. Co-located with satellite gateway system 120-2 may be bidirectional satellite communication link 130-2. Satellite gateway system 120-2 and bidirectional satellite communication link 130-2 may service a first group of user equipment while satellite gateway system 120-1 and bidirectional satellite communication link 130-1 may service another set of user equipment. Satellite gateway system 120-2 and bidirectional satellite communication link 130-2 may function similarly to satellite gateway system 120-1 and bidirectional satellite communication link 130-1 respectively.

Embodiments can use various techniques to mitigate interference between gateway systems 120. Some embodiments mitigate interference by geographic diversity. For example, geographic locations 140-1 and 140-2 may be separated by a significant enough distance such that the same frequencies can be used for uplink and downlink communications between bidirectional satellite communication links 130 and relay satellite 110 without a significant amount of interference occurring. Other embodiments use frequency diversity (e.g., multiple colors, such as different frequency bands or sub-bands) between adjacent gateway systems 120. Other embodiments use temporal diversity (e.g., different communication timing) between adjacent gateway systems 120.

While two instances of satellite gateway systems 120 and bidirectional satellite communication links 130 are illustrated as part of system 100, it should be understood that in some embodiments only a single satellite gateway system and a single bidirectional satellite communication link system are present or a greater number of satellite gateway systems 120 and bidirectional satellite communication links 130 are present. For example, for a satellite-based Internet service provider, four to eight (or significantly more) satellite gateway systems 120 and associated bidirectional satellite communication links 130 may be scattered geographically throughout a large region, such as North America.

User communication components 160, along with user terminals 180 and satellite antennas 170 (which can collectively be referred to as "user equipment") may be located in a fixed geographic location or may be mobile. For example, user communication components 160-1, satellite antenna 170-1, and user terminal 180-1 may be located at a residence of a subscriber that has a service contract with the operator of satellite gateway systems 120. The term "user" is intended only to distinguish from the gateway side of the network 100. For example, user terminal 180 can be associated with an individual subscriber to satellite communication services, with a corporate or other entity user, with a robotic user, with an employee of the satellite communication services provider, etc.

User communication components 160-1, satellite antenna 170-1, and user terminal 180-1 may be located at a fixed location 190. Fixed location 190 may be a residence, a building, an office, a worksite, or any other fixed location at which access to Internet 152 and/or private data source 151 is desired. User communication components 160-2, satellite antenna 170-2, and user terminal 180-2 may be mobile. For instance, such equipment may be present in an airplane, ship, vehicle, or temporary installation. Such equipment may be present at geographic location 195; however, geographic location 195 may change frequently or constantly, such as if the airplane, ship, or vehicle is in motion.

Satellite antenna 170-1 may be a small dish antenna, approximately 50 to 100 centimeters in diameter. Satellite antenna 170-1 may be mounted in a location that is pointed towards relay satellite 110, which may be in a geosynchronous orbit around the earth (i.e., the relay satellite 110 is a geosynchronous, or GEO, satellite). As such, the direction in which satellite antenna 170-1 is to be pointed stays constant. In some embodiments, low Earth orbit (LEO) and medium Earth orbit (MEO) satellites may be used in place of a geosynchronous satellite in the system. In some embodiments, relay satellite 110 is a high-throughput multi-beam satellite that communicates with user terminals using multiple (e.g., hundreds of) spot beams. In case of a multi-beam GEO satellite, for example, each of the multiple spot beams illuminates a respective coverage area. A fixed-location user terminal 180 can communicate with the relay satellite 110 generally via a particular one of the spot beams, unless there is some reason to reassign the user terminal 180 (e.g., in case of a gateway system 120 outage). Communications with mobile user terminals 180 can be handed off between spot beams as the mobile user terminal 180 moves through different coverage areas. In the case of non-GEO (e.g., MEO or LEO) relay satellites 110, spot beam coverage areas typically trace a path across the surface of the Earth with changes in the satellite's position relative to the Earth.

User communication component 160-1 refers to the hardware necessary to translate signals received from relay satellite 110 via satellite antenna 170-1 into a format which user terminal 180-1 can decode. Similarly, user communication components 160-1 may encode data received from user terminal 180-1 into a format for transmission via satellite antenna 170-1 to relay satellite 110. User communication components 160-1 may include a satellite communication modem. This modem may be connected with or may have incorporated a wired or wireless router to allow communication with one or more user terminals. In system 100, a single user terminal, user terminal 180-1, is shown in communication with user communication components 160-1. It should be understood that, in other embodiments, multiple user terminals may be in communication with user communication components 160-1. User terminal 180-1 may be various forms of computerized devices, such as: a desktop computer; a laptop computer; a smart phone; a gaming system or device; a tablet computer; a music player; a smart home device; a smart sensor unit; Voice over IP (VOIP) device, or some other form of computerized device that can access Internet 152 and/or private data source 151. Since user communication components 160 and a satellite antenna 170 can continue communicating with a satellite gateway system even if a user terminal 180 is not currently communicating with user communication components 160-1, it should be understood that some instances of user equipment may not include a user terminal 180.

Despite being in motion or in a temporary location, user communication components 160-2, satellite antenna 170-2, and user terminal 180-2 may function similarly to user communication components 160-1, satellite antenna 170-1, and user terminal 180-1. In some instances, satellite antenna 170-2 may either physically or electronically point its antenna beam pattern at relay satellite 110. For instance, as a flight path of an airplane changes, satellite antenna 170-2 may need to be aimed in order to receive data from and transmit data to relay satellite 110. As discussed in relation to user terminal 180-1, only a single user terminal, user terminal 180-2, is illustrated as in communication with user communication components 160-2 as part of system 100. It should be understood that in other embodiments, multiple user terminals may be in communication with user communication components 160-2. For example, if such equipment is located on an airplane, many passengers may have computerized devices, such as laptop computers and smart phones, which are communicating with user communication components 160-2 for access to Internet 152 and/or private data source 151. As detailed in relation user terminal 180-1, user terminal 180-2 may be various forms of computerized devices, such as those previously listed.

Embodiments described herein relate to a portion of the user terminal 180, namely the receive path of a Very Small Aperture Terminal (VSAT). A VSAT is generally a two-way satellite ground station or a stabilized maritime VSAT antenna with a dish antenna that is smaller than 3 meters. The parabolic shape of the dish has special reflective properties that enable it to concentrate and focus signals to a single point, i.e., the focal point. The dish receives and transmits signals, after reflecting and concentrating them, from and to satellites (e.g., satellite 110). VSATs may be used to transmit narrowband data (point of sale transactions, such as, credit card, polling or RFID data; or SCADA), or broadband data (for the provision of Satellite Internet access to remote locations, VOIP or video). VSATs may also be used for transportable, on-the-move (utilizing phased array antennas) or mobile maritime communications. VSAT remote terminals may be used to communicate data, voice and video, between a remote site location and a satellite hub. As used herein, a VSAT can include user communication components 160, user terminal 180 components, etc. For example, the VSAT can include a router/gateway, which can route IP datagrams between a space link and a standard network interface, for example, an Ethernet interface, a Wi-Fi interface, or the like.

While FIG. 1 illustrates only two instances of user communication components 160, two instances of satellite antennas 170, and two instances of user terminals 180, system 100 may involve any suitable number (e.g., hundreds or thousands) of instances of satellite antennas, user equipment, and user terminals distributed across various geographic locations. Some number of these instances may be in relatively fixed locations, while others of these instances may have periodically or constantly changing locations (e.g., mobile terminals, or aero terminals for providing Internet service in aircraft, or the like). Further, while only a single relay satellite 110 is shown, some architectures include multiple satellites, such as cooperating satellites in a constellation, multiple satellites with overlapping coverage areas, etc.

Traditional air interface designs for multi-beam satellite communication systems tended to allocate a fixed amount of capacity to each beam. For example, a satellite coverage area is divided into cells, and each beam signal from the satellite is directed towards a particular cell in a fixed manner. Such a fixed allocation can be inefficient in cases where demand for capacity changes over time. As one example, while a network is being deployed (e.g., infrastructure is being built out, customers are being onboarded, etc.), demand can change over time in particular geographic regions. As another example, different time zones can enter and exit peak demand times at different times of day. Such changes in demand can be predictable, or not; and they can be periodic, or not. As such, it can be desirable to architect the system 100 in a manner that supports dynamic allocation of capacity to different beams.

Beam hopping is one approach to providing dynamic capacity allocation. A beam hopping satellite can illuminate different cells at different times and for different durations of time as a way to dynamically change the manner in which the satellite allocates its available bandwidth. In a beam-hopping system, the beams move between cells with varying duty cycle, and each beam can illuminate any particular cell for a duration (called "dwell time"). Depending on the capacity demands of the cells, the dwell times can be varied. For example, a longer dwell time for a particular cell effectively allocates more capacity to that cell. A beam hopping time plan determines cell dwell times and beam hopping cycle among the cells. The beam hopping time plan can be prescheduled (the beam hopping proceeds according to regular and periodic illumination patterns), or it can be demand-driven (the beam hopping proceeds according to a time plan that is non-periodic, generated dynamically based on traffic profiles, or the like).

In recent years, DVB-S2X standards introduced satellite air interface designs that support non-continuous ("burst") communications, such as for beam hopping. The designs include physical layer structures, such as superframes with particular symbol configurations. For example, a preamble ("training sequence") is introduced before each burst to allow for receiver synchronization. Between bursts, an "idle-sequence" is introduced to allow the satellite to beam switch. For example, a beam hopping transmission channel can switch carrier frequency, carrier bandwidth, number of carriers per cell, and/or other parameters.

In non-beam hopping architectures, user terminals 180 (e.g., VSATs) typically receive a continuous signal, which it can continuously sample and use for continuous adaptation of filters, timing and frequency recovery (e.g., bit timing recovery), and/or other parameters for maintaining synchronization. For example, the VSAT receives a continuous signal, the demodulator constantly tracks frequency and system timing to maintain synchronization, and an automatic gain control (AGC) block continuously conditions the input signal. However, in a beam hopping architecture (or any burst architecture), the user terminals 180 must be able to maintain synchronization and recover a received signal payload even though the signal is non-continuous. In some cases, proper operation of the user terminals 180 relies on proper demodulation even with very short and/or varying dwell times, even when the user terminals 180 do not have prior knowledge of a burst time plan, even when there are long gaps between dwell times for a particular user terminal 180, even while concurrently supporting multiple DVB-S2X beam hopping frame formats, even with high doppler rates (e.g., LEO systems tend to have appreciably higher doppler rates than GEO systems), even though beam hopping signals may be received from different gateways 120 (e.g., a first burst transmission is coming from a satellite 110 being fed by a first gateway 120, and a previous burst transmission came from the same or a different satellite 110 being fed by a second gateway 120), etc.

As noted above, conventional VSAT receive paths (e.g., demodulators) rely on a continuous signal to maintain synchronization, symbol recovery, etc. For example, when a signal is not being received, the demodulator can lose synchronization. Once the next burst transmission begins and a valid signal is again being received, the demodulator must recover synchronization. Such recovery can involve the demodulator going through a re-acquisition process, which can take several (e.g., even tens of) frames, during which the VSAT may not be able to communicate. The result is effectively a loss of capacity (e.g., reduced throughput).

Embodiments described herein include a novel VSAT demodulator architecture that receives burst signals (e.g., according to DVB-S2X standards) in a beam hopping satellite system and addresses various signal conditions seen by the terminal. For example, the VSAT is configured to adaptively synchronize to a received signal while the VSAT is "in dwell" (i.e., receiving a valid burst signal), and the VSAT is configured to pause synchronization otherwise (i.e., when the VSAT is not in dwell). The novel demodulator architecture can maintain synchronization in context of burst communications, while continuing to meet packet error performance requirements.

Figure 2:
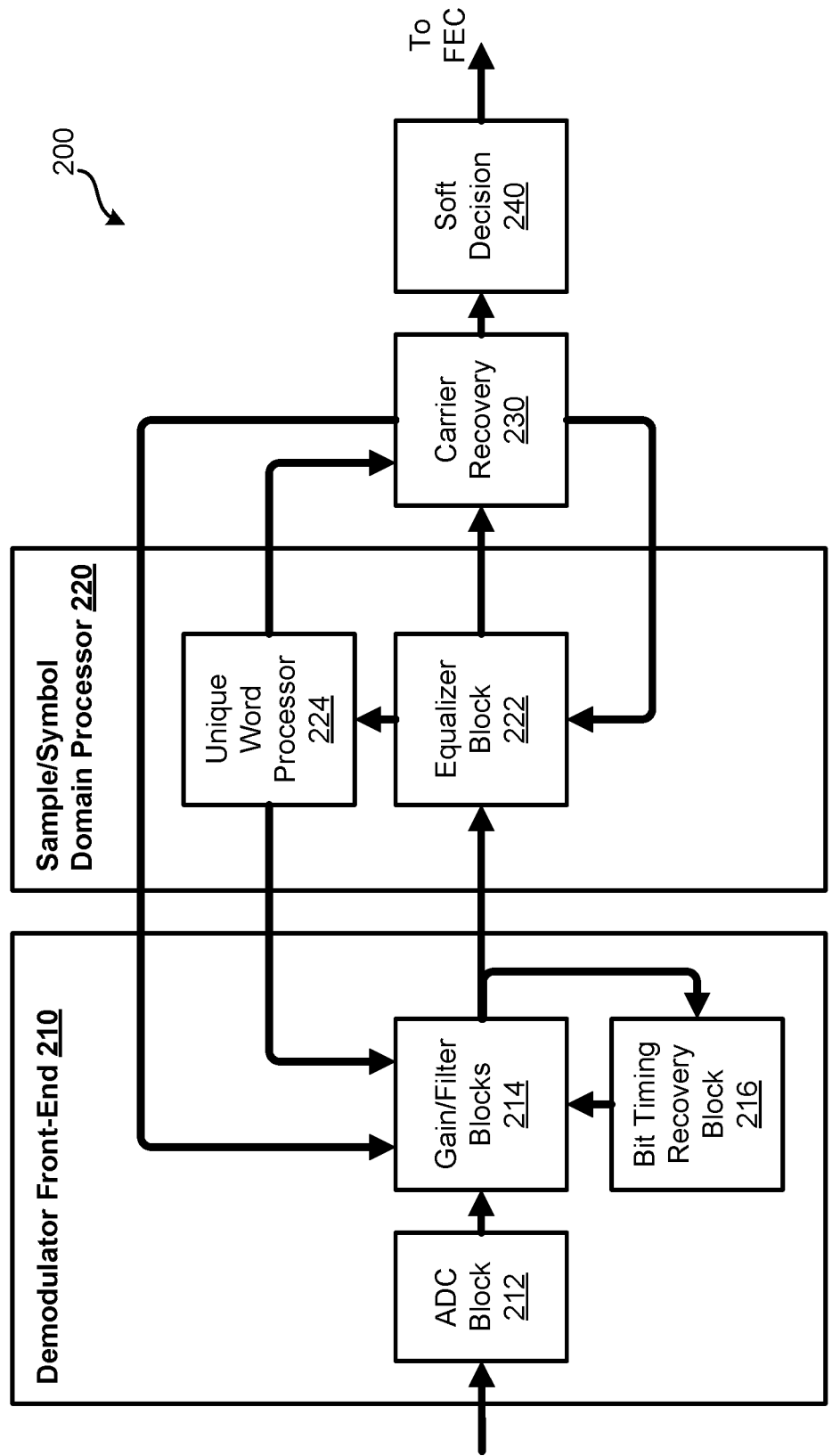
FIG. 2 shows a simplified block diagram of partial conventional implementation of continuous mode satellite terminal receiver, such as in a conventional VSAT.

For added context, FIG. 2 shows a simplified block diagram of partial conventional implementation of continuous mode satellite terminal receiver 200, such as in a conventional VSAT. The illustrated satellite terminal receiver 200 is an example of a conventional type of receiver path compatible with modern high-throughput satellite standards, such as the second-generation Digital Video Broadcasting by Satellite (DVB-S2) standards and their extensions (DVB-S2X), such as defined in European Standards EN 302 307-1 and EN 302 307-2. In general, the satellite terminal receiver 200 can be represented as a demodulator front-end 210 in communication with a sample/symbol domain processor 220, which communicates with a clock supply module 230 and a soft decision module 240.

As illustrated, the demodulator front-end 210 can include an analog to digital conversion (ADC) block 212, one or more gain and/or filter blocks 214, and a bit timing recovery (BTR) block 216. An analog forward downlink signal is received by the ADC block 212, which converts the analog signal to digital samples. The digital samples can be passed through the one or more filter blocks 214 for processing. The one or more gain and/or filter blocks 214 can generally include various types of sample processing and/or signal conditioning components, such as one or more gain control blocks, one or more low-pass filters, one or more half-band filters (e.g., decimation filters for downsampling to a common sample rate), one or more re-samplers, etc.

The bit timing recovery (BTR) block 216 attempts to obtain and maintain a lock on the bit timing from the stream of samples by tracking frequency and timing error (e.g., symbol rate drift). For example, though a signal is being received at some nominal bitrate, the actual received bitrate can drift to either side of the nominal bitrate (e.g., center frequency), and the BTR block 216 tries to lock onto and track the drifting bit timing to output a bitstream with a constant sample rate (e.g., 2 samples/symbol) that is synchronized to the incoming signal. As illustrated, the BTR block 216 typically accomplishes this synchronization by continuously adapting to the received signal based on one or more feedback loops. For example, the BTR block 216 and the gain and/or filter blocks 214 are in a feedback control loop, and the gain and/or filter blocks 214 also receive feedback from downstream components (e.g., from the sample/symbol domain processor 220 and from the clock supply module 230).

The constant-sample-rate bitstream output by the gain and/or filter blocks 214 can be passed to the sample/symbol domain processor 220 to provide synchronization information in both the sample and symbol domains. The sample/symbol domain processor 220 can include at least an equalizer block 222 and a unique word processor block 224. The equalizer block 222 can receive the output of the gain and/or filter blocks 214 from the demodulator front-end 210. For example, the equalizer block 222 can be a fractional equalizer operating at 2 samples/symbol, such that it is insensitive to bit timing offsets. The output of the equalizer block 222 can be passed to the unique word processor block 224 to locate a unique word and to decode header information indicating modulation and coding information. For example, the physical layer signaling (PLS) header (e.g., defined in the DVB-S2 standard) indicates the modulation and forward error correction (FEC) rate of the current frame. Such information can be used to maintain frame synchronization.

The output of the equalizer block 222 and the unique word processor block 224 can both be passed to a clock supply module 230 (which can track residual frequency and phase distortion. The clock supply module 230 can also compute error information to update equalizer coefficients, which can be fed back to the equalizer block 222. Output from the clock supply module 230 can be passed to the soft decision module 240 to estimate soft decision values to be sent to downstream components, such as a forward error correction (FEC) subsystem (e.g., the output of the soft decision module 240 can be a scalar for the FEC). As illustrated, the frequency correction information from the unique word processor block 224 and frequency correction information from the clock supply module 230 can be fed back to the gain and/or filter blocks 214 to help maintain synchronization.

As noted above, dynamic adaptation by the satellite terminal receiver 200 of FIG. 2 relies on a continuously received forward link signal. When the signal is not present, the satellite terminal receiver 200 loses synchronization. In a beam hopping architecture (or other burst communication environments), the forward-link signal is only present during dwell times. During non-dwell times, any received signal is not intended for the receiver and cannot be relied upon as more than Gaussian noise. In such an environment, the satellite terminal receiver 200 will tend to lose synchronization in each non-dwell time and will have to re-acquire the signal (i.e., resynchronize) in each dwell time. One concern is that such re-acquisition can take significant time, which may result in the satellite terminal receiver 200 being unable to demodulate large portions of the beginning of each burst transmission, which can reduce effective throughput. Another concern is that attempts by the gain and/or filter blocks 214 to adapt without presence of a valid signal can result in excessive filter and/or gain settings, such as gain control components being set to output very high (e.g., maximum) gain. Such excessive filter and/or gain settings can consume a large amount of wasted power and can generate a large amount of undesirable heat. Further, when a next burst transmission arrives, such settings can tend initially to saturate (or oversaturate) components of the demodulator, which can damage components and/or yield other undesirable effects.

Figure 3:
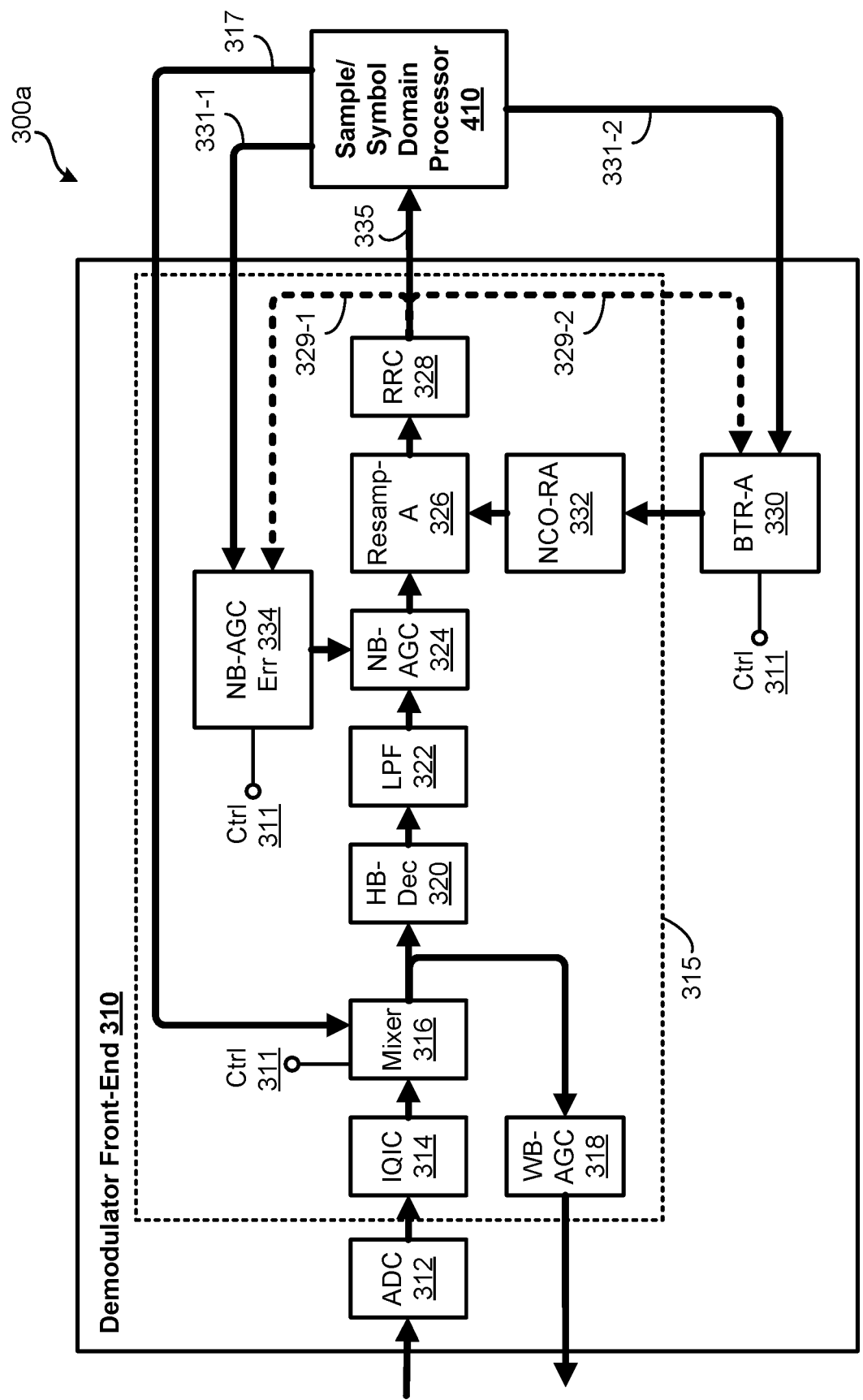
FIG. 3 shows a block diagram of a first portion of the VSAT receive path including an implementation of a demodulator front-end in context of a sample/symbol domain processor, according to embodiments described herein.
Figure 4:
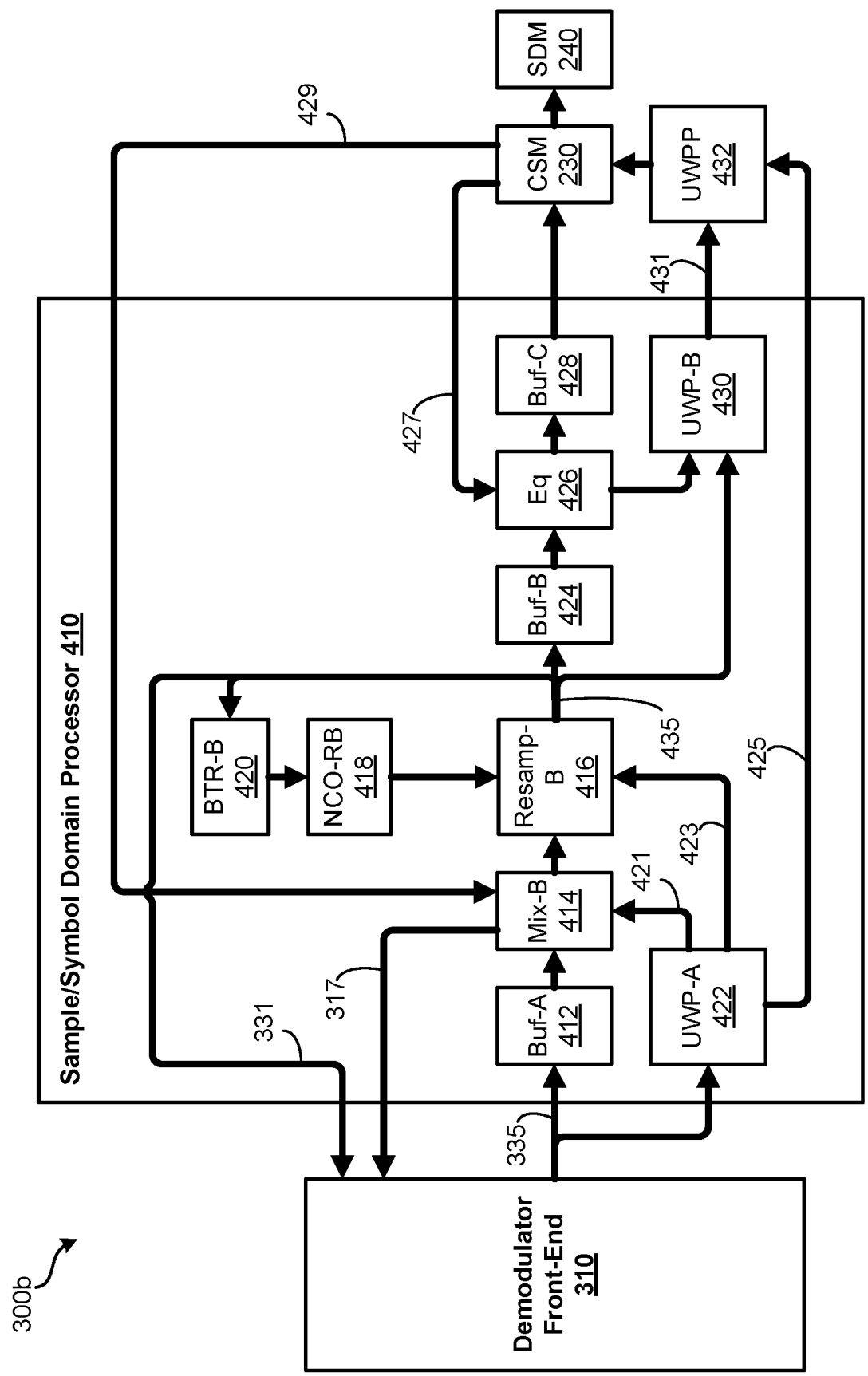
FIG. 4 shows a block diagram of a second portion of the VSAT receive path including an implementation of the sample/symbol domain processor in context of the demodulator front-end and other downstream components, according to embodiments described herein.

In contrast, novel embodiments described herein use detection of superframe structures to adapt during dwell times and to freeze adaptation during non-dwell times. An illustrative embodiment of a VSAT receive path 300 for demodulating burst (e.g., beam hopping) communications is shown in FIGS. 3 and 4. FIG. 3 shows a block diagram of a first portion of the VSAT receive path 300a (e.g., a demodulator) including an implementation of a demodulator front-end 310 in context of a sample/symbol domain processor 410, according to embodiments described herein. FIG. 4 shows a block diagram of a second portion of the VSAT receive path 300b including an implementation of the sample/symbol domain processor 410 in context of the demodulator front-end 310 and other downstream components, according to embodiments described herein. FIGS. 3 and 4 are described concurrently for added clarity.

As described herein, the VSAT receive path 300 is configured to adapt to an incoming (forward-link) signal during dwell times and to freeze adaptation during non-dwell times. During a dwell time, the VSAT receive path 300 looks for a valid start of superframe (SOSF) indication (e.g., the DVB-S2X SOSF bit sequence). The sample/symbol domain processor 410 locates the SOSF and estimates timing and frequency offset. Once the SOSF is located, the demodulator front-end 310 starts adaptation of automatic gain control (AGC), frequency-locked loop (FLL), and equalization blocks using the last valid adaptation (LVA) values. If this is a SOSF following another valid superframe, the LVA values will be those used for adaptation during receipt of the preceding superframe; if this is a SOSF following a non-dwell time, the LVA values will be those used for adaptation during the previous dwell time prior to freezing.

As illustrated in FIG. 3, the demodulator front-end 310 includes an ADC block 312, a BTR block (BTR-A 330), and a filter and gain control system 315 that includes a number of gain, filter, and other signal processing and conditioning components. These components of the demodulator front-end 310 are responsible for compensating for phase, amplitude, and/or DC offset distortions; for translating the signal in the frequency domain; for downsampling the signal; and for maintaining symbol synchronization using a bit-timing recovery loop (including BTR-A 330) and match filtering. In some implementations, the output of the demodulator front-end 310 is maintained at a constant sample rate (e.g., 2 samples/symbol) with phase aligned to have an on-sample (constellation points) and off-sample. As described further below, the output of the demodulator front-end 310 is processed by the sample/symbol domain processor 410 and other downstream components to detect superframe (e.g., and frame) timing, to detect a present modcode (modulation and forward error correction rate), to generate feedback error signals for updating filter and equalizer coefficients of the filter and gain control system 315, etc.

An analog forward-link signal is received by the ADC block 312 and is passed to the filter and gain control system 315. In the filter and gain control system 315, the signal is compensated by a compensator block, such as an In-Phase Quadrature-Phase Imbalance Compensator (IQIC) block 314 before being passed to a mixer 316. As described herein, when a burst communication first begins (i.e., at the start of the first superframe of the communication), the demodulator front-end 310 does not yet have any frequency or timing information by which to synchronize to the signal. For example, conventionally, there may be no way to accurately recover symbol timing, or to determine optimal sample timing, etc. until enough signal has been received to re-acquire synchronization. Particularly in cases where the burst transmission is short (e.g., a single superframe), the time it takes for such re-acquisition may adversely impact performance. If the demodulator front-end 310 is left to continue adapting during non-dwell times, the various adaptive features (e.g., the ACG, FLL, equalization, etc.) would be adapting to invalid signal information and would begin attempting to reacquire synchronization at the next dwell time from an unpredictable set of adaptation values and/or from settings that can lead to saturation.

Instead, the mixer 316 of the demodulator front-end 310 receives feedback from downstream components based on LVA values whenever a dwell time begins (e.g., at the start of any first superframe, or at the start of any superframe). As such, the demodulator front-end 310 begins acquisition of a burst transmission with initial adaptation values that are likely very close to the correct timing and frequency offset corrections needed for accurate symbol timing recovery. In some implementations, sample-domain frequency correction information from a unique word processor (UWP-A 422) of the sample/symbol domain processor 410 and symbol-domain frequency correction information from a clock supply module (CSM 230) of the sample/symbol domain processor 410 can be fed back to the mixer 316. For example, as illustrated in FIG. 4, the outputs of UWP-A 422 and CSM 230 are fed to mixer (Mix-B 414) of the sample/symbol domain processor 410, and an output generated by Mix-B 414 (e.g., representing an estimated timing and frequency offset) is fed back to mixer 316.

The output of the mixer 316 of the demodulator front-end 310 is passed through components of the filter and gain control system 315 to generate a front-end output signal 335. In the illustrated implementation, the output of the mixer 316 is passed through a half-band decimation filter (HB-Dec) 320, a low-pass filter (LPF) 322, a narrowband AGC (NB-AGC) 324, a re-sampler (Resamp-A) 326, and a root-raised cosine (RRC) filter 328. The output of the mixer 316 can also be passed separately through a wideband AGC (WB-AGC) 318 for signal pre-conditioning, or the like.

In some embodiments, the demodulator front-end 310 can be configurable to support continuous communications (e.g., to perform in a manner similar to that of the conventional continuous-mode demodulator front-end 310 illustrated in FIG. 2). In such embodiments, feedback paths 329-1 and 329-2 are activated, and the RRC filter 328 output (i.e., the output of the demodulator front-end 310) is fed back directly to support bit timing recovery and gain control. As illustrated, the front-end output signal 335 from the RRC filter 328 is fed via path 329-1 to an error block (NB-AGC Err 344) to generate a feedback error signal for the NB-AGC 324, thereby continuously adapting the gain control according to the feedback. The front-end output signal 335 is also fed via path 329-2 to a synchronization loop, which includes a bit timing recovery block (BTR-A 330) and a numerically controlled oscillator block (NCO-RA 332). Thus, in the continuous mode, the internal feedback loop within the demodulator front-end 310 can maintain alignment with the constellation points of the received burst transmission signal, such that the front-end output signal 335 is aligned to the constellation points.

When the demodulator front-end 310 is configured for non-continuous operation, feedback paths 329-1 and 329-2 are de-activated (or may not be present in the demodulator front-end 310 at all). For example, at least NB-AGC Err 344 can include a control input 311 to select which error signal is received. In continuous mode, the control input 311 is set to receive the front-end output signal 335 from the RRC filter 328; in non-continuous mode, the control signal 311 is set to receive a constellation-aligned output signal 435 from the sample/symbol domain processor 410. In non-continuous mode, the front-end output signal 335 at the RRC filter 328 output is passed to the sample/symbol domain processor 410. The sample/symbol domain processor 410 detects presence or absence of a burst transmission (i.e., whether the VSAT receive path 300 is in, or is approaching a dwell time or a non-dwell time) based on protocol-defined superframe structures. During a dwell time, when valid signal information is being received, the sample/symbol domain processor 410 generates frequency and timing estimates based on the front-end output signal 335 and produces a constellation-aligned output signal 435 that aligns sample and symbol timing to constellation points. The sample/symbol domain processor 410 then feeds back the constellation-aligned output signal 435 to the demodulator front-end 310 via feedback paths 331.

As illustrated, when a valid burst transmission signal is present, the constellation-aligned output signal 435 is fed via path 331-1 to NB-AGC Err 344 to generate a feedback error signal for the NB-AGC 324, thereby continuously adapting the gain control according to the feedback from the sample/symbol domain processor 410. The constellation-aligned output signal 435 is also fed via path 331-2 to BTR-A 330 of the synchronization loop. Thus, in the non-continuous mode, the front-end output signal 335 is not aligned to the constellation points; rather, the feedback loop extends into the sample/symbol domain processor 410, where the constellation-aligned output signal 435 to maintain alignment with the constellation points of the received burst transmission signal.

When the sample/symbol domain processor 410 detects that no valid burst transmission signal is present, adaptation by at least the filter and gain control system 315 is frozen. In some implementations, the adaptation is frozen by asserting a zero-error signal to NB-AGC Err 344. For example, the control signal 311 is set to receive a zero-error signal, or to internally generate a zero-error signal in NB-AGC Err 344. As such, the feedback error signal for NB-AGC 324 will indicate that no error is present. When no error is present, adaptive components of the filter and gain control system 315 will maintain their settings (i.e., they will not attempt to adapt to anything). In other implementations, when the sample/symbol domain processor 410 detects that no valid burst transmission is present, the sample/symbol domain processor 410 can be configured to output the constellation-aligned output signal 435 as a zero-error signal.

Turning to FIG. 4, a block diagram is shown of an example sample/symbol domain processor 410. In general, the sample/symbol domain processor 410 includes a sample-domain stage and a symbol-domain stage. In the sample-domain stage, the front-end output signal 335 is processed by a first unique word processor (UWP-A) 422 that implements a sample-domain SOSF processor to detect a SOSF indication of a superframe. UWP-A 422 can generate three outputs: a sample-domain frequency estimate 421, a sample-domain timing estimate 423, and a SOSF output signal 425. The SOSF output signal 425 can indicate a recovered SOSF code, a recovered superframe format indication (SFFI), and/or other information. The sample-domain frequency estimate 421 can be passed to a sample-domain mixer (Mix-B) 414, the sample-domain timing estimate 423 can be passed to a re-sampler (Resamp-B) 416, and the SOSF output signal 425 can be passed to a UWP processor (UWPP) 432 (e.g., as an output of the sample/symbol domain processor 410).

Concurrent with passing the front-end output signal 335 to UWP-A 422, the front-end output signal 335 is also passed to Mix-B 414 via a buffer (Buf-A) 412. Buf-A 412 is configured to effectively delay the signal path to make time for processing by UWP-A 422. The output of Mix-B 414 is passed to Resamp-B 416, which outputs the constellation-aligned output signal 435. The constellation alignment results from a combination of the sample-domain frequency estimate 421 impacting the output of Mix-B 414 at the input to Resamp-B 416, the sample-domain timing estimate 423 coming from UWP-A 422, and feedback of the constellation-aligned output signal 435 back into Resamp-B 416 through a sample-domain synchronization path that includes a second bit timing recovery block (BTR-B 420) and a second corresponding NCO (NCO-RB) 418.

The constellation-aligned output signal 435 is also passed to the symbol-domain stage of the sample/symbol domain processor 410. Similar to the sample-domain stage, the constellation-aligned output signal 435 is passed to a second unique word processor (UWP-B) 430. While the burst transmission signal is being demodulated, UWP-B 430 continues to detect any next SOSF (e.g., where the burst transmission is a sequence of multiple superframes) and any end of superframe (EOSF) indication. For example, UWP-B 430 can implement some or all of a symbol-domain EOSF processor, a symbol-domain physical layer header (PLH) processor, and a symbol-domain SOSF processor. The symbol-domain EOSF processor can output an EOSF location indication, such as indicating detection of a postamble sequence, detection of a length of the superframe or superframe sequence, etc. The symbol-domain PLH processor can parse the PLH from a superframe and/or output information encoded by the PLH, such as a modulation scheme, a forward error correction scheme, whether a superframe is a last superframe of a sequence, etc. The symbol-domain SOSF processor can parse a superframe header (e.g., superframe header (SFH), extended header field (EHF), protection level indicator (PLI), etc.) and/or output information encoded by the superframe header. Any or all of the outputs of UWP-B 430 can be passed to the UWPP 432, which can generate corresponding output information for use by the CSM 230.

Concurrent with passing the constellation-aligned output signal 435 to UWP-B 430, the constellation-aligned output signal 435 is also passed to an equalizer 426 via a second buffer (Buf-B) 424. Buf-B 424 is configured to effectively delay the signal path to make time for processing by UWP-B 430. Equalizer 426 is coupled with feedback with the CSM 230. For example, the output of equalizer 426 is passed to the CSM 230 via a third buffer (Buf-C) 428 configured to effectively delay the signal path to make time for processing by UWPP 432. The CSM 230 generates an equalization error and feeds back the equalization error via path 427 to the equalizer 426, so that the equalizer 426 can adapt. The error can also be fed back via path 429 to Mix-B 414.

Based on the equalization error feedback from the CSM 230 and the sample-domain frequency estimate 421 from UWP-A 422, Mix-B 414 effectively generates frequency and timing offset estimates. These frequency and timing offset estimates can be fed back via path 317 to mixer 316 of the demodulator front-end 310, which can aid in adaptation by the filter and gain control system 315. As described above, when the sample/symbol domain processor 410 detects that no valid burst transmission is present (i.e., a non-dwell time), adaptation of the filter and gain control system 315 is frozen. In some cases, such freezing includes freezing the adaptation of some or all of AGC blocks, frequency-locked loop (FLL) blocks, and equalization blocks. For example, as described above, AGC adaptation can be implemented by asserting or selecting a zero-error signal at NB-AGC Err 334, so that NB-AGC 324 will not adapt. Similarly, the feedback to BTR-A 330 can be controlled (e.g., a zero-error signal is asserted or selected by control signal 311) to freeze the synchronization loop (i.e., the FLL). Further, the feedback to mixer 316 can be controlled (e.g., a zero-error signal is asserted or selected) to freeze the equalization. For example, the output of the CSM 230 can be forced to zero, or a different zero-error signal can be selected by control signal 311 (or in any other suitable manner).

Using the above architecture and techniques, the frequency and timing offset estimates are applied to current superframe samples present in Buf-A 412 (a buffered version of front-end output signal 335) by Mix-A 414 and Resamp-B 416. During a dwell time, the frequency and timing offset estimates are continuously adapting over a large feedback loop from mixer 316 to CSM 230. Near, but prior to, the end of the dwell time, adaptation is frozen, so that the frequency and timing offset estimates are maintained at last valid adaptation (LVA) values. During the subsequent non-dwell time, adaptation continues according to the LVA values. When a next dwell time is detected (e.g., by detecting a SOSF), the sample/symbol domain processor 410 can begin to re-acquire the signal, including seeking frame and superframe boundaries and settling to new, reliable frequency and timing offset estimates. Until such re-acquisition occurs, embodiments can continue to freeze adaptation of the demodulator front-end 310 at the LVA values. Once re-acquisition occurs, the demodulator front-end 310 can be switched back into an adaptation mode, and feedback-based adaptation of the filter and gain control system 315 (e.g., and the equalization and synchronization loops) can resume.

By freezing the frequency and timing offset estimates and/or other settings in non-dwell times according to the LVA values, the demodulator can quickly begin correctly demodulating a new burst transmission in a new dwell time. For example, in certain cases, a dwell time can be the duration of only a single superframe, or a small number of superframes. In some embodiments, Resamp-B 416 continues to provide constant-timing phase samples to the equalizer 426 even during non-dwell times. Without continuing to provide constant-timing phase samples, in a next dwell time, if there a timing offset is present on the next SOSF, the equalizer coefficients can drift. Over a period of time, if left uncorrected, the equalizer coefficients (e.g., a center tap) can drift out of an equalizer window, such that the equalizer 426 will be unable to track properly. Such embodiments of Resamp-B 416 and the local timing recovery system of the sample/symbol domain processor 410 can remove and track any timing offset present between dwell times and can maintain stability of equalizer coefficients (e.g., of center tap location).

Some embodiments are configured to perform reliably even where the superframe and/or burst transmission (dwell time) duration is variable and unknown by configuring the sample/symbol domain processor 410 (e.g., UWP-B 430 and/or UWP-A 422) to continue searching for next SOSF indications during a dwell time until an EOSF indication is reached. The EOSF indication indicates a location of an end of the present dwell time. The end of a dwell time can be indicated by a last superframe bit as part of a protocol-defined (e.g., DVB-S2X) superframe format, detected by searching of a protocol-defined postamble sequence, indicated by an upcoming bit location that is encoded in the protocol-defined superframe format, etc. As described herein, detection of the EOSF triggers freezing of the adaptation of the demodulator front-end 310 (i.e., setting the demodulator front-end 310 to a freeze mode). In some implementations, the adaptation freezing begins upon detection of the last bit of the superframe in accordance with the EOSF detection. In other implementations, the adaptation freezing begins prior to the end of the last superframe, such as upon detection of the postamble. Switching the demodulator front-end 310 to the freeze mode prior to the very end of the last superframe can help ensure that the LVA values maintained in freeze mode are generated from reliably demodulated data. For example, cases may arise in which the last bit or bits of the last superframe are not decodable or are not decoded properly, which could yield bad LVA values if used for adaptation.

As described herein, the demodulator front-end 310 can operate in at least two non-continuous modes: an adaptive mode, and a freeze mode. In the adaptive mode, the filter and gain control system 315 of the demodulator front-end 310 uses feedback from the sample/symbol domain processor 410 to continuously adapt frequency and timing of demodulation to the received burst transmission signal. In the freeze mode, the filter and gain control system 315 of the demodulator front-end 310 is held at LVA values so that it does not adapt. For example, a first radiofrequency (RF) burst transmission is received by the demodulator in a first dwell time. While the transmission is being received, the demodulator front-end 310 recovers a data stream from the first RF burst transmission using the filter and gain control system 315 set to the adaptive mode. During the receiving, the sample/symbol domain processor 410 detects an EOSF) location indicating an ending location for the first dwell time. Based on the detecting, the demodulator front-end 310 is set to the freeze mode, such that at least the filter and gain control system 315 are frozen at LVA values and are non-adaptive starting at or just prior to the end of the dwell time. The freeze mode is held for the duration of the subsequent non-dwell time, at least until detection (by the sample/symbol domain processor 410) of a SOSF indication, indicating a start of a second RF burst transmission. At or near the start of the second RF burst transmission (e.g., after re-acquisition of the signal), the demodulator front-end 310 is set back to the adaptive mode, such that the filter and gain control system 315 resume adapting to feedback from the sample/symbol domain processor 410.

Figure 5A:
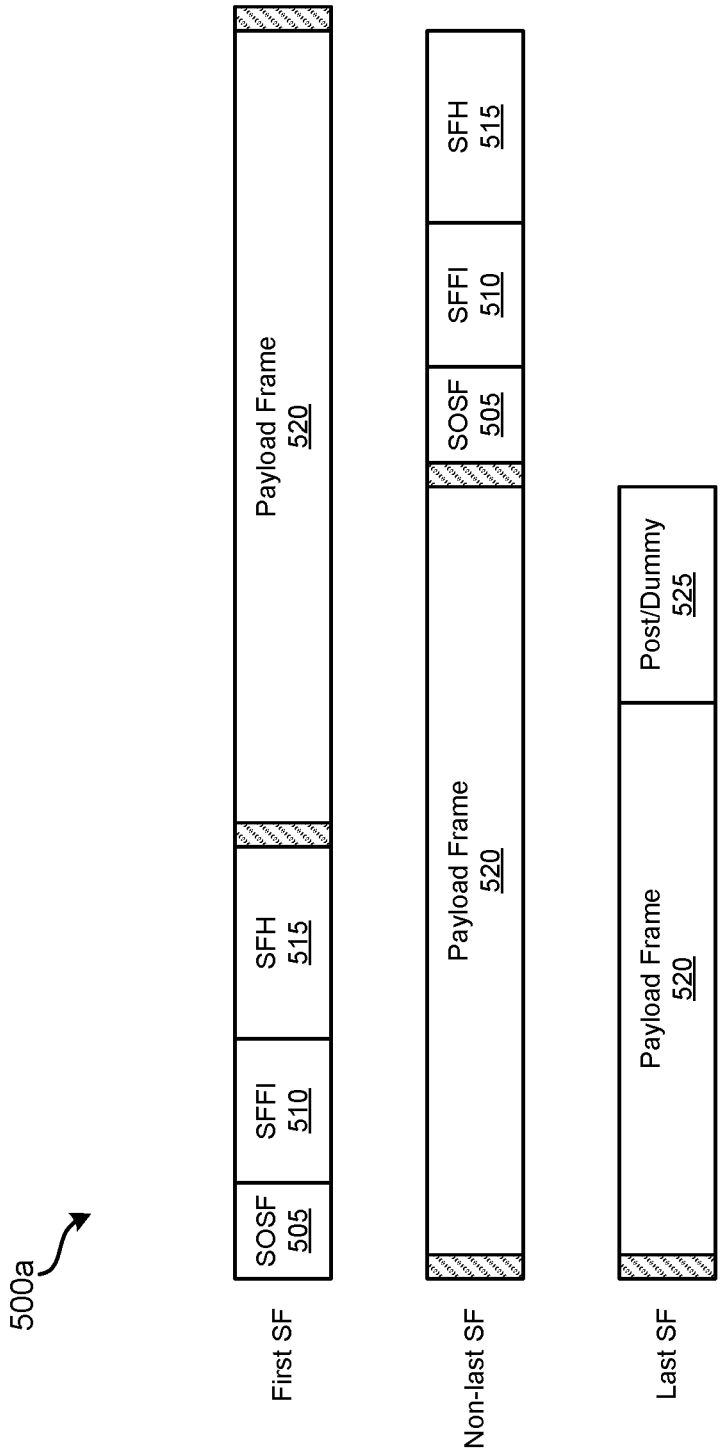
FIG. 5A shows an illustrative representation of a so-called "SF5" superframe structure.
Figure 5B:
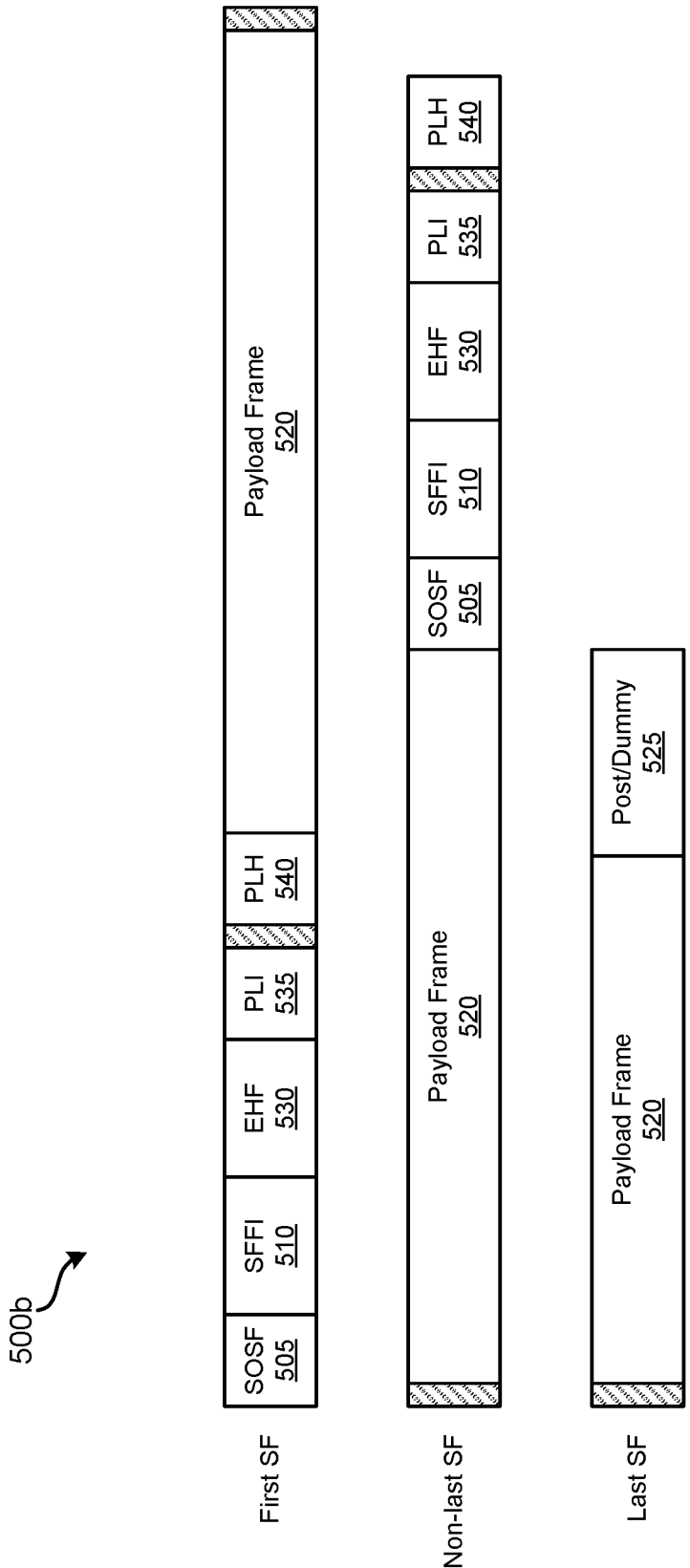
FIG. 5B shows an illustrative representation of a so-called "SF6" superframe structure.
Figure 5C:
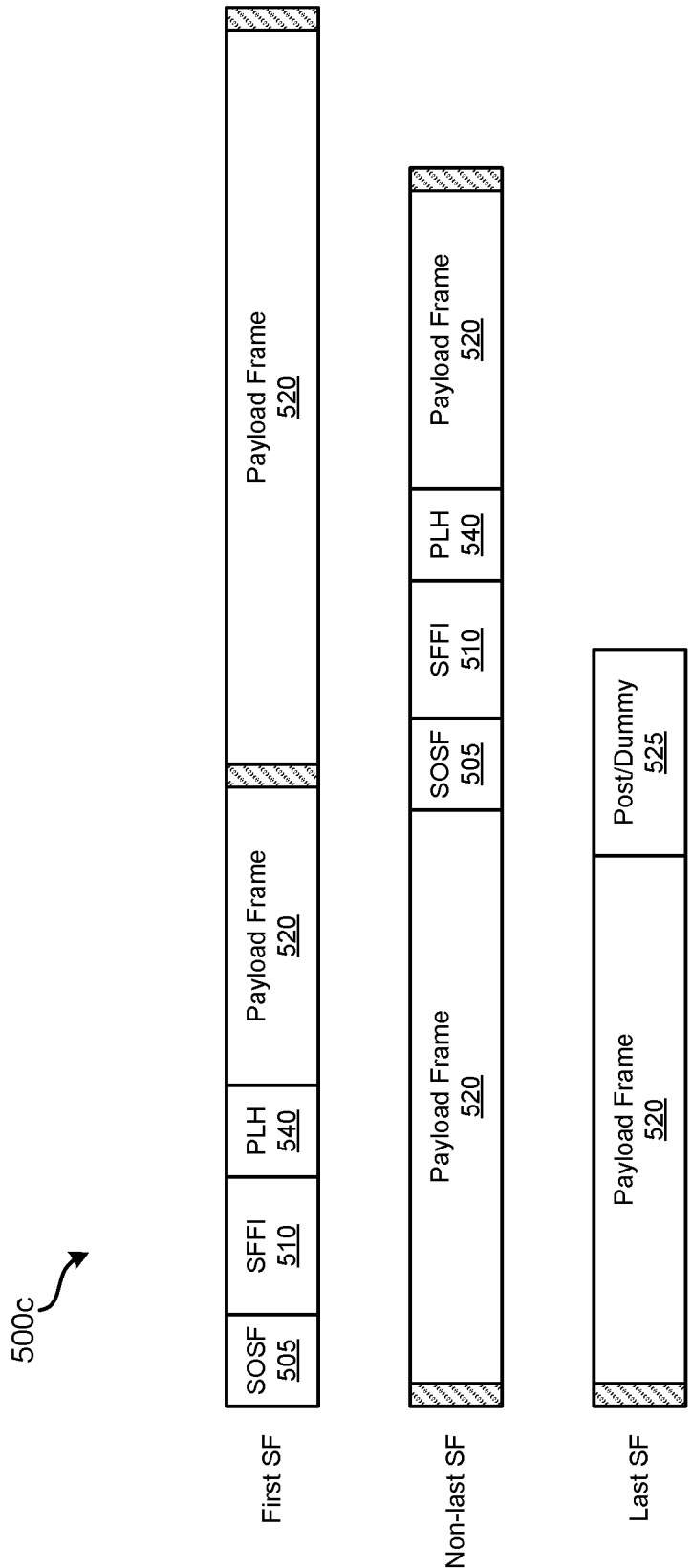
FIG. 5C shows an illustrative representation of a so-called "SF7" superframe structure.

As described herein, embodiments are configured to select whether the demodulator front-end 310 is in the adaptive mode or the freeze mode based on detecting SOSF and/or EOSF indications in a protocol-defined superframe structure. For added context, FIGS. 5A-5C show three examples of superframe structures as defined by Annex E of the DVB-S2X standards. The Annex E superframe structures are configured for use with beam hopping architectures.

FIG. 5A shows an illustrative representation of a so-called "SF5" superframe structure 500a. FIG. 5B shows an illustrative representation of a so-called "SF6" superframe structure 500b. FIG. 5C shows an illustrative representation of a so-called "SF7" superframe structure 500c. Each of the superframe structures 500 begins with a Start of Super Frame (SOSF) block 505, which is sequence of bits in a preamble of the superframe that identifies the start of the superframe. The superframes can be of varying length, and there can be specific indicators to identify the final superframe in a dwell time. Each superframe also includes one or more payload frames 520 that include data symbols encoded based on a MODCOD (a modulation and coding scheme).

Turning to FIG. 5A, the SF5 superframe structure 500a begins with a preamble that includes a SOSF block 505, a superframe format indication (SFFI) block 510, and a superframe header (SFH) block 515. Each block has a defined length. The SFH block 515 can indicate a location of a first complete physical layer header (PLH), which is a predefined bit sequence in the payload that facilitates fragmentation of the superframe into payload frames 520; a protection level indicator (PLI), which facilitates use of variable header protection levels, such as for very low signal-to-noise ratio (VLSNR) terminals; an indication of whether pilot symbol sequences are being used; and reserved bits. Embodiments can estimate a signal-to-noise ratio based on the preamble (e.g., based on the SFH block 515) to determine whether the PLI is good enough for the VSAT receive path to handle. If so, the VSAT receive path can proceed with demodulation. If not, the VSAT receive path can resume detection of SOSF. For example, such embodiments only proceed with demodulation of a superframe after passing an initial determination that the superframe can be reliably demodulated.

A single burst communication can include one or more superframes. If the number of superframes in the burst is unknown, embodiments can continue to perform SOSF detection until a last superframe in the burst is received. In some implementations, the length of each superframe is known. In such implementations, a next SOSF detection can be scheduled to occur near the end of the present superframe. In other implementations, the length of the superframe is not known, and SOSF detection can be repeatedly attempted until a next SOSF is detected. In accordance with the SF5 superframe structure 500a, the PLH of a final frame of a continuous sequence of frames (e.g., of superframes or of payload frames 520) indicates that the final frame will end with a postamble 525. Thus, the final PLH can be used by the VSAT receive path to know where valid data of the current burst transmission will end (e.g., where the present dwell time will end), such that adaptation can be frozen prior to the end of the valid data. The postamble 525 (e.g., including, or followed by a set of dummy symbols) can provide the satellite communication system with time for beam hopping, or the like.

The SF5 superframe structure 500a tends to be more applicable to prescheduled beam hopping architectures based on regular and/or periodic illumination patterns. The SF6 superframe structure 500b and the SF7 superframe structure 500c tend to be more applicable to traffic-driven (demand-driven) beam hopping architectures, such as where illumination patterns are dynamically generated to meet capacity demand, or where an illumination time plan is generated based on a traffic profile. Turning to FIG. 5B, the SF6 superframe structure 500b is similar to the SF5 superframe structure 500a, except that the SFH block 515 is replaced with an extended header field (EHF) block 530 and an explicit PLI block 535. The EHF block 530 can facilitate better acquisition of the signal, and the explicit PLI block 535 can permit use in context of VLSNR terminals. The SF6 superframe structure 500b can also include an explicit PLH block 540 in the payload frame 520.

Similar to the SF5 superframe structure 500a, a single burst communication can include one or more superframes. However, in the SF6 superframe structure 500b, the SOSF block 505 can occur at the end of an entire payload frame 520. As such, embodiments can schedule performance of SOSF detection at or near the end of payload frames 520, or repeatedly throughout receipt of the burst communication. As described with reference to the SF5 superframe structure 500a, the PLH of a final frame of a continuous sequence of frames (e.g., of superframes or of payload frames 520) indicates that the final frame will end with a postamble 525. Thus, the final PLH can be used by the VSAT receive path to know where valid data of the current burst transmission will end (e.g., where the present dwell time will end), such that adaptation can be frozen prior to the end of the valid data.

Turning to FIG. 5C, the SF7 superframe structure 500c is similar to the SF5 superframe structure 500a and the SF6 superframe structure 500b, except that the format does not include either an SFH block 515 or an EHF block 530. Thus, the SF7 superframe structure 500c tends to provide higher capacity (by reducing its overhead) in exchange for not supporting VLSNR terminals. Otherwise, the structure is similar to that of the SF6 superframe structure 500b. The SF7 superframe structure 500c includes an explicit PLH block 540 in the payload frame 520 and can have an SOSF block 505 occur at the end of an entire payload frame 520. As such, embodiments can schedule performance of SOSF detection at or near the end of payload frames 520, or repeatedly throughout receipt of the burst communication. As described with reference to the SF5 superframe structure 500a, the PLH of a final frame of a continuous sequence of frames (e.g., of superframes or of payload frames 520) indicates that the final frame will end with a postamble 525. Thus, the final PLH can be used by the VSAT receive path to know where valid data of the current burst transmission will end (e.g., where the present dwell time will end), such that adaptation can be frozen prior to the end of the valid data.

Figure 6:
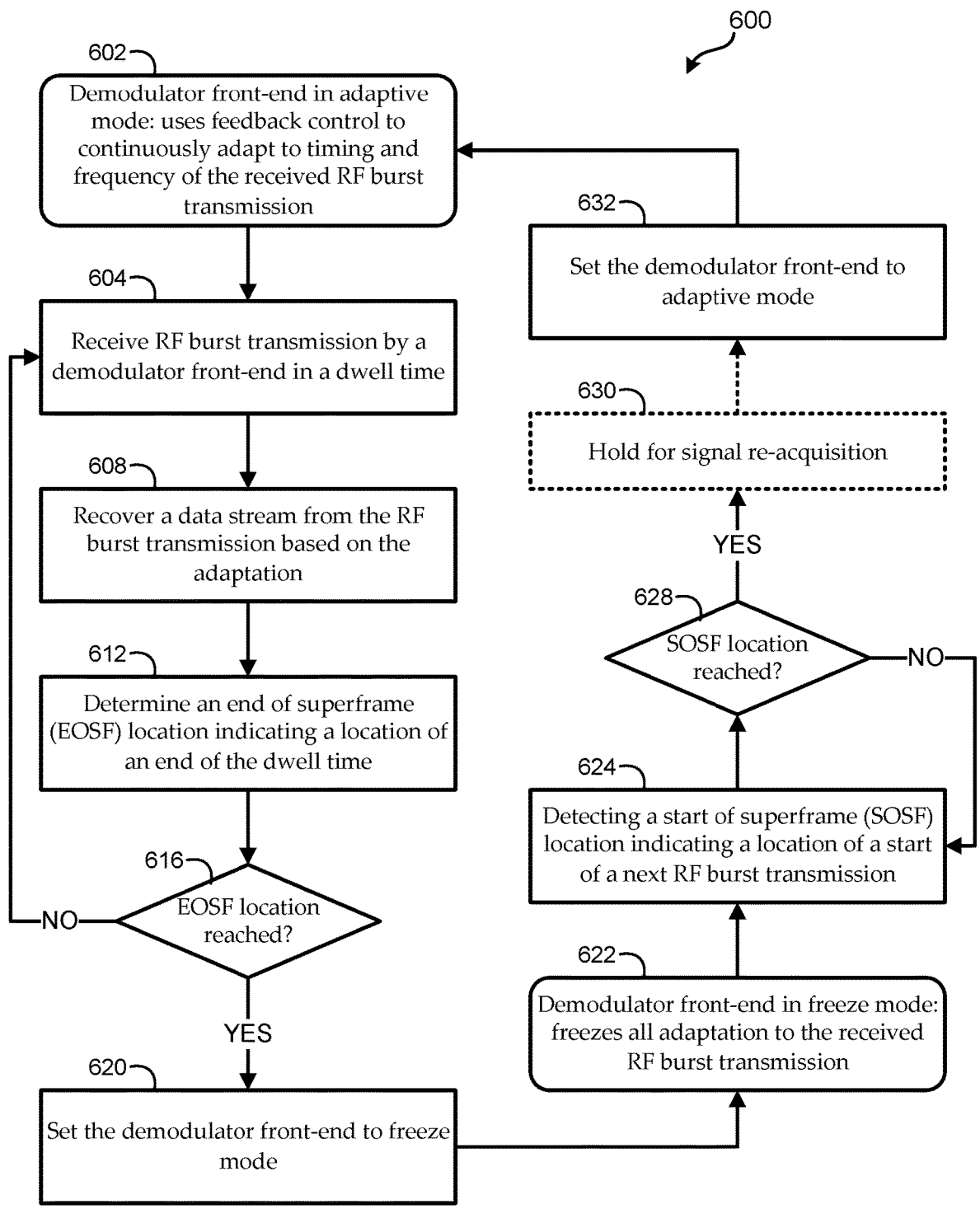
FIG. 6 shows a flow diagram of an illustrative method for demodulating burst communications in a demodulator of a receiver, according to embodiments described herein.

FIG. 6 shows a flow diagram of an illustrative method 600 for demodulating burst communications in a demodulator of a receiver, according to embodiments described herein. Embodiments of the method 600 can be performed using any suitable system, including those described above with reference to FIGS. 3 and 4. For example, embodiments of the method 600 are implemented by a VSAT satellite receiver operating in a multi-beam satellite and/or multi-satellite communication network configured for beam hopping. As described above, embodiments operate in context of a receiver demodulator having a demodulator front-end configured to selectively operate in either a first "adaptive" mode, or in a second "freeze" mode. The method 600 can be considered as essentially cyclic, such that the method 600 can begin at stage 602 or 622 (or in any other suitable location).

Embodiments of the method 600 begin at stage 602 with the demodulator front-end set to the adaptive mode, in which the demodulator front-end uses feedback control to continuously adapt to timing and frequency of a received radiofrequency (RF) burst transmission (e.g., a beam-hopping satellite forward-link signal). In this mode, at stage 604, the demodulator can receive the RF burst transmission in a corresponding dwell time. As described herein, the RF burst transmission can be a sequence of protocol-defined superframes, such as superframes defined by the DVB-S2X protocols. While receiving the RF burst transmission, at stage 608, the demodulator can recover a data stream from the RF burst transmission in accordance with the adaptation being performed in the adaptive mode.

At stage 612, while receiving and decoding the RF burst transmission, embodiments can determine an end of superframe (EOSF) location indicating a location of an end of the present dwell time. The detection can be performed by a sample/symbol domain processor of the demodulator that is in communication with the demodulator front-end. In some embodiments, the detection of the EOSF is based on detecting a last bit of the last superframe of a sequence of superframes of the RF burst transmission. In other embodiments, the detection of the EOSF is based on detecting a protocol-defined postamble of the last superframe of a sequence of superframes of the RF burst transmission.

As indicated by decision block 616, embodiments of the method 600 can continue to iterate through stages 604-612 (i.e., continuing to receive and demodulate the RF burst transmission, and continuing to search for the EOSF indication) until the EOSF location is reached. In some embodiments, the determination at stage 612 indicates that the EOSF location is in some future location of the RF burst transmission, and the method 600 can continue to iterate through stages 604-612 (e.g., or, more accurately, the method 600 can iterate stages 604 and 608 without having to re-make the determination at stage 612) until that future location is reached, at which time the decision block 616 is satisfied. In other embodiments, the determination at stage 612 is a determination as to whether an indication of the EOSF location has been detected, and the method 600 can continue to iterate through stages 604-612 until that detection has occurred. In some such embodiments, the detection yields an indication of a future EOSF location, and the method 600 effectively continues to iterate stages 604 and 608 until the future location is reached, at which time the decision block 616 is satisfied. In other such embodiments, the detection is a present detection that the EOSF location has been reached (e.g., detection of a postamble indicating the end of the burst transmission), which also indicates that decision block 616 is satisfied.

When the EOSF location is reached, embodiments can set the demodulator front-end to the freeze mode at stage 620. The setting at stage 620 occurs at a time when reliable demodulation of the RF burst transmission can be ensured. For example, based on the manner of determining the EOSF location, the setting at stage 620 can occur at the last decoded bit of the RF burst transmission (e.g., where it can be ensured that the demodulator can reliably decode all of the bits up to the last bit), upon detection of the postamble (e.g., prior to the last bit of the RF burst transmission, but after all payload bits), or in any suitable location at or near the end of the RF burst transmission. After the setting at stage 620, as indicated in stage 622, the demodulator front-end is configured to freeze any further adaptation of the demodulator front-end while in the freeze mode.

While the demodulator front-end is in the freeze mode, at stage 624, embodiments of the method 600 can detect a start of superframe (SOSF) location indicating a location of a start of a next RF burst transmission. As indicated by decision block 628, the method 600 can iterate until the SOSF location is reached. In some embodiments, the iteration of stage 624 includes continuing to search for an indication of the SOSF until one is detected. The SOSF location can be encoded in a preamble of the superframe, or in any suitable manner. In some implementations, an RF burst transmission includes a sequence of superframes, and each begins with a SOSF indication; the detecting at stage 624 intends to find a first SOSF of a first superframe of the sequence of the next RF burst transmission (i.e., indicating the start of the next RF burst transmission). Because of the iteration, the demodulator front-end can effectively be held in the freeze mode from the end of the prior RF burst transmission until at least the start of the next burst transmission, corresponding to at least the duration of the intervening non-dwell time.

At stage 632, responsive to reaching the SOSF location of the next burst transmission according to decision block 628, embodiments of the method 600 set the demodulator front-end back to the adaptive mode. For example, after the next burst transmission begins in the next dwell time, the method 600 cycles back to stage 602, and the demodulator front-end resumes adapting. In some embodiments, the adaptation resumes (i.e., the demodulator front-end returns to adaptive mode) upon reaching of the SOSF location. In other embodiments, at stage 630, the method 630 continues to hold the demodulator front end in the freeze mode until synchronization is re-acquired for the new RF burst transmission. For example, the sample/symbol domain processor attempts to synchronize to the RF burst transmission without providing feedback control signals to the demodulator front-end; and the sample/symbol domain processor only resumes providing feedback control signals once the synchronization is re-acquired.

Figure 7:
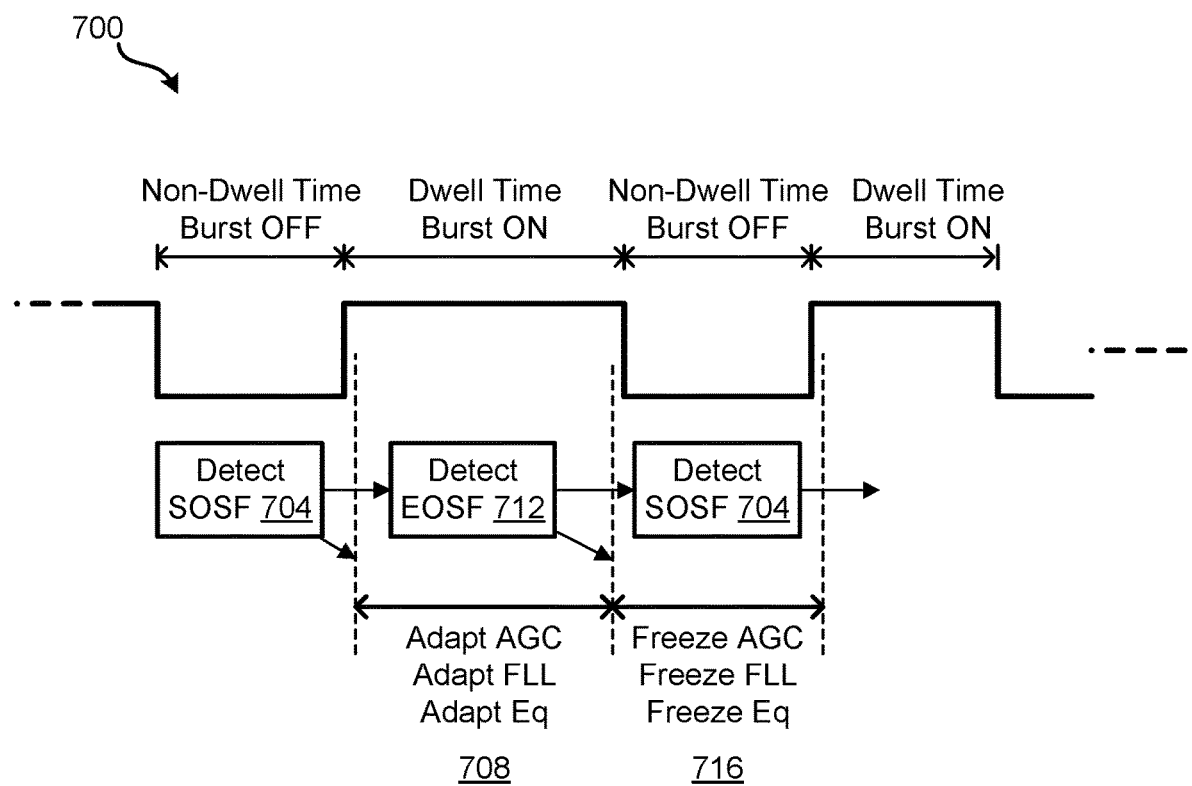
FIG. 7 illustrates a simplified version of a method, such as the method of FIG. 6, in context of dwell and non-dwell times.

FIG. 7 illustrates a simplified version of a method 700, such as the method 600 of FIG. 6, in context of dwell and non-dwell times. As illustrated, an example of a burst transmission profile shows that a receiver effectively sees transmissions intended for the receiver being present during dwell times and not being present during non-dwell times; any adjacent dwell times are separated by a non-dwell time. During a non-dwell time, while there is no RF burst transmission intended for the receiver (during "burst off"), the method 700 searches for a SOSF indication. At stage 704, the SOSF indication is detected, and the SOSF for the first superframe of the next RF burst transmission is located. At stage 708, the demodulator front-end is set to adaptive mode, and the method 700 begins to adapt automatic gain control (AGC), a frequency-locked loop (FLL), and/or equalization (Eq) of the demodulator front-end. As described herein, the adaptation can either begin at the start of the next burst transmission, or after synchronization of the next burst transmission has been re-acquired.

The adaptation in stage 708 continues for some or all of the duration of the next dwell time, which the burst transmission is being received and demodulated (during "burst on"). During the dwell time, the method 700 searches for an EOSF indication at stage 712. In some embodiments, the duration of the burst transmission is known in advance, such that the EOSF determination can be performed without parsing the burst transmission. In other embodiments, the duration of the burst transmission is variable and/or unknown, and the determination in stage 712 involves parsing of information from the burst transmission. In some such embodiments, the EOSF location is encoded in headers and/or other data of the superframes. For example, a superframe header can indicate when a superframe is a last superframe of a burst transmission, a length of a superframe, and/or other information that is usable to determine the EOSF location. In other such embodiments, a postamble or other predetermined sequence is detected as the EOSF location, or as an indication of the EOSF location. As described herein, the EOSF location can be configured as a location close to, but prior to, the end of the burst transmission.

When the EOSF location is reached, the demodulator front-end can be set back to freeze mode in stage 716. In freeze mode, the method 700 can freeze adaptation of the AGC, the FLL, and/or the Eq. As described herein, the freezing can effectively force the demodulator front-end to continue operating throughout the duration of at least the non-dwell time using last valid adaptation (LVA) values obtained from adaptation during the preceding dwell time. At some point, during the non-dwell time, the method 700 again searches for a SOSF indication, effectively iterating back to stage 704. The method 700 can continue in this manner for all dwell times and non-dwell times.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for demodulating burst communications in a demodulator of a receiver, the method comprising:
    first receiving a first radiofrequency (RF) burst transmission by the demodulator in a first dwell time;
    recovering, during the first receiving, a data stream from the first RF burst transmission with a demodulator front-end of the demodulator set to a first mode in which the demodulator front-end uses feedback control to continuously adapt to timing and frequency of the first RF burst transmission;

determining, during the first receiving, an end of superframe (EOSF) location indicating a location of an end of the first dwell time;

first setting the demodulator front-end to a second mode according to the EOSF location, the second mode freezing the continuous adaptation of the demodulator front-end;

holding the demodulator front-end in the second mode over a non-dwell time following the end of the first dwell time;

detecting, during the holding, a start of superframe (SOSF) location indicating a location of a start of a second RF burst transmission; and second setting the demodulator front-end back to the first mode responsive to the detecting.

2. The method of claim 1, wherein:

the demodulator front-end generates a front-end output signal based on feedback-control of an equalizer loop, an automatic gain control (AGC) loop, and a frequency-locked loop (FLL); and the freezing the continuous adaptation of the demodulator front-end comprises freezing feedback control of all of the equalizer loop, the AGC loop, and the FLL.

3. The method of claim 1, wherein:

the demodulator front-end generates a front-end output signal;

a sample/symbol domain processor of the demodulator receives the front-end output signal and generates a corresponding constellation-aligned output signal; and the demodulator front-end, in the first mode, uses feedback control based on feedback of at least the constellation-aligned output signal to continuously adapt to the timing and the frequency of the first RF burst transmission.

4. The method of claim 3, wherein:

the demodulator front-end comprises automatic gain control (AGC) and a frequency-locked loop (FLL); and the constellation-aligned output signal is fed back from the sample/symbol domain processor to adapt both the AGC and the FLL.

5. The method of claim 3, wherein:

the sample/symbol domain processor of the demodulator dynamically updates frequency and timing offset estimates based on the front-end output signal and the constellation-aligned output signal; and the demodulator front-end, in the first mode, uses feedback control further based on feedback of the frequency and timing offset estimates to continuously adapt to the timing and the frequency of the first RF burst transmission.

6. The method of claim 1, further comprising:

second receiving a second RF burst transmission by the demodulator in a second dwell time immediately following the non-dwell time; and recovering, during the second receiving, a data stream from the second RF burst transmission with the filter and gain control system of the demodulator in the first mode.

7. The method of claim 6, wherein the second setting comprises:

acquiring frame synchronization with the second RF burst transmission, over a period of time beginning at a start of the second dwell time and lasting for shorter than the second dwell time, by using feedback control within the sample/symbol domain processor with the filter and gain control system held in the second mode; and the second setting the demodulator front-end back to the first mode is performed only after the acquiring.

8. The method of claim 1, wherein:

the first RF burst transmission comprises a sequence of superframes formatted according to a protocol-defined superframe structure; and the determining the EOSF location comprises parsing information encoded in the protocol-defined superframe structure that indicates a location of an end of a last superframe of the sequence of superframes.

9. The method of claim 8, wherein the information encoded in the protocol-defined superframe structure that indicates the location of the end of the last superframe of the sequence of superframes is a predefined postamble sequence.

10. The method of claim 1, wherein the sample/symbol domain processor comprises a sample-domain re-sampler and an equalizer, and further comprising:

generating and providing constant-timing phase samples, by the sample-domain re-sampler to the equalizer, during both the first dwell time and the non-dwell time.

11. A receiver demodulator system for demodulating burst communications, the system comprising:

a demodulator front-end configured selectively to operate in either an adaptive mode or a freeze mode, such that:

in the adaptive mode, the demodulator front-end receives a radiofrequency (RF) burst transmission in a corresponding dwell time, and recovers a data stream from the first RF burst transmission by using feedback control to continuously adapts the demodulator front-end to timing and frequency of the first RF burst transmission; and in the freeze mode, the demodulator front-end freezes adaptation of the 9 demodulator front-end; and a sample/symbol domain processor, coupled in feedback with the demodulator front-end, and configured to:

when the demodulator front-end is in the adaptive mode, determine an end of superframe (EOSF) location indicating a location of an end of the dwell time and a start of a non-dwell time, and set the demodulator front-end to the freeze mode at a time determined based on the EOSF location; and when the demodulator front-end is in the freeze mode, detect a start of superframe (SOSF) location indicating a location of a start of a next RF burst transmission, and set the demodulator front-end to the adaptive mode at a time determined based on the SOSF location, such that the demodulator front-end operates in the adaptive mode for at least a portion of a duration of each dwell time, and the demodulator front-end operates in the freeze 22 mode for at least a duration of each non-dwell time.

12. The receiver demodulator system of claim 11, wherein:

the demodulator front-end comprises at least a portion of an equalizer loop, an automatic gain control (AGC) loop, and a frequency-locked loop (FLL);

in the adaptive mode, the demodulator front-end generates a front-end output signal based on feedback control by the sample/symbol domain processor of the equalizer loop, the AGC loop, and the FLL; and in the freeze mode, the demodulator front-end freezes adaptation by freezing the feedback control of the equalizer loop, the AGC loop, and/or the FLL.

13. The receiver demodulator system of claim 11, wherein, when the demodulator front-end is in the adaptive mode:
the demodulator front-end generates a front-end output signal; and
the sample/symbol domain processor receives the front-end output signal, generates a corresponding constellation-aligned output signal, and feeds the constellation-aligned output signal back to the demodulator front-end as at least a portion of the feedback control.

14. The receiver demodulator system of claim 13, wherein:
the demodulator front-end comprises:
an automatic gain control (AGC) block controlled at least by an AGC error block; and
a frequency-locked loop (FLL) including a bit timing recovery (BTR) block and a numerical controlled oscillator; and
the constellation-aligned output signal is fed back from the sample/symbol domain processor to both the AGC error block and the BTR block.

15. The receiver demodulator system of claim 13, wherein:
the sample/symbol domain processor dynamically updates frequency and timing offset estimates based on the front-end output signal and the constellation-aligned output signal; and
when the demodulator front-end is in the adaptive mode, the feedback control is further based on feedback of the frequency and timing offset estimates from the sample/symbol domain processor.

16. The receiver demodulator system of claim 11, wherein:
the sample/symbol domain processor is further configured, responsive to detecting the SOSF location, to acquire frame synchronization with the next RF burst transmission with the demodulator front-end held in the freeze mode; and
the sample/symbol domain processor is configured to set the demodulator front-end to the adaptive mode only after the acquiring.

17. The receiver demodulator system of claim 11, wherein:
the RF burst transmission comprises a sequence of superframes formatted according to a protocol-defined superframe structure; and
the sample/symbol domain processor is configured to determine the EOSF location by parsing information encoded in the protocol-defined superframe structure that indicates a location of an end of a last superframe of the sequence of superframes.

18. The receiver demodulator system of claim 17, wherein the information encoded in the protocol-defined superframe structure that indicates the location of the end of the last superframe of the sequence of superframes is a predefined postamble sequence.

19. The receiver demodulator system of claim 17, wherein the protocol-defined superframe structure is defined by a Digital Video Broadcasting System version 2 extension (DVB-S2X) protocol.

20. The receiver demodulator system of claim 11, wherein the demodulator front-end outputs a front-end output signal, and the sample/symbol domain processor comprises:
a sample-domain stage including a sample-domain re-sampler to output a constellation-aligned output signal based on processing of the front-end output signal by a sample-domain unique word processor (UWP) and a sample-domain mixer, and on feedback via a bit timing recovery loop; and
a symbol-domain stage including a symbol-domain equalizer to output an equalized sample stream based on processing of the constellation-aligned output signal by a symbol-domain unique word processor (UWP) and feedback from a clock supply module (CSM).

21. The receiver demodulator system of claim 20, wherein:
sample-domain re-sampler is configured to generate the constellation-aligned output signal as a stream of constant-timing phase samples to the equalizer during both the dwell time and the non-dwell time.

22. The receiver demodulator system of claim 11, wherein:
the receiver demodulator system is implemented in a very small aperture terminal (VSAT) satellite of a satellite receiver; and
the RF burst transmission is received from a satellite.

23. The receiver demodulator system of claim 22, wherein:
the satellite is a beam-hopping satellite.

* * * * *

UNITED STATES PATENT AND TRADEMARK OFFICE
CERTIFICATE OF CORRECTION

| | | |
|---|---|---|
| PATENT NO. | : 12,470,341 B2 | Page 1 of 1 |
| APPLICATION NO. | : 18/064370 | |
| DATED | : November 11, 2025 | |
| INVENTOR(S) | : Seokho Kim, Sri Bhat and Brandon Lasher | |

It is certified that error appears in the above-identified patent and that said Letters Patent is hereby corrected as shown below:

In the Claims

In Claim 11, Column 22, Line 34, please delete "9"

In Claim 11, Column 22, Line 52, please delete "22"

Signed and Sealed this
Twenty-third Day of December, 2025

John A. Squires
*Director of the United States Patent and Trademark Office*